(12) United States Patent
Chang

(10) Patent No.: US 11,215,419 B2
(45) Date of Patent: Jan. 4, 2022

(54) MUZZLE FLASH SIMULATOR

(71) Applicant: Acetk Corp Ltd., Taipei (TW)

(72) Inventor: Yung-Hui Chang, New Taipei (TW)

(73) Assignee: Acetk Corp Ltd., Taipei (TW)

( * ) Notice: Subject to any disclaimer, the term of this patent is extended or adjusted under 35 U.S.C. 154(b) by 0 days.

(21) Appl. No.: 17/383,401

(22) Filed: Jul. 22, 2021

(65) Prior Publication Data

US 2021/0356228 A1    Nov. 18, 2021

Related U.S. Application Data

(60) Provisional application No. 63/122,484, filed on Dec. 8, 2020.

(51) Int. Cl.
*F41A 33/02* (2006.01)
*H05B 47/16* (2020.01)
*H05B 47/115* (2020.01)

(52) U.S. Cl.
CPC ............ *F41A 33/02* (2013.01); *H05B 47/115* (2020.01); *H05B 47/16* (2020.01)

(58) Field of Classification Search
CPC .......... F41A 33/02; F41A 33/04; F41A 33/06; H05B 47/16; H05B 47/115; F21S 10/06; F21V 14/02; F21V 23/0407; F21V 3/00; F21V 3/02; F21W 2131/406; F21Y 2115/10; F21A 21/32; F21A 21/34; F21G 11/00; F21G 3/2655; F41J 5/02; H04W 4/80

See application file for complete search history.

(56) References Cited

U.S. PATENT DOCUMENTS

| 9,746,272 | B2 * | 8/2017 | Lowrance | F41A 33/02 |
| 10,041,757 | B2 * | 8/2018 | Grossnickle | F41A 21/32 |
| 2016/0169627 | A1 * | 6/2016 | Northrup | F41G 3/2655 434/22 |
| 2018/0163949 | A1 * | 6/2018 | Joseph | F21V 23/0407 |

FOREIGN PATENT DOCUMENTS

WO    WO2017/067747 A1 *   4/2017

* cited by examiner

*Primary Examiner* — Alexander H Taningco
*Assistant Examiner* — Pedro C Fernandez
(74) *Attorney, Agent, or Firm* — Winston Hsu

(57) ABSTRACT

A muzzle flash simulator for simulating the visual effect of muzzle flash of the real firearms, configured to illuminate projectiles passing away from an internal passage, includes multiple illuminating components and multiple combinations of sets of instructions for each one of the illuminating components at indicated time periods, to create various beam effects in front of the internal passage.

5 Claims, 16 Drawing Sheets

FIG. 9A
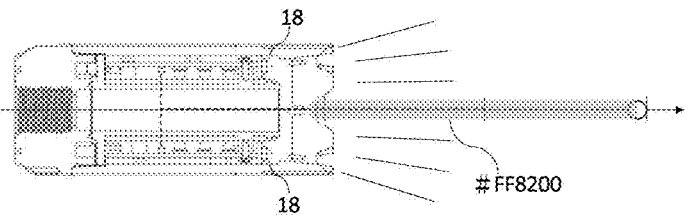
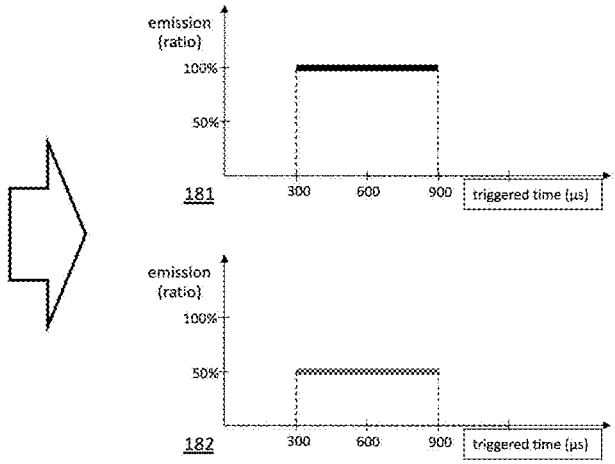
FIG. 9B
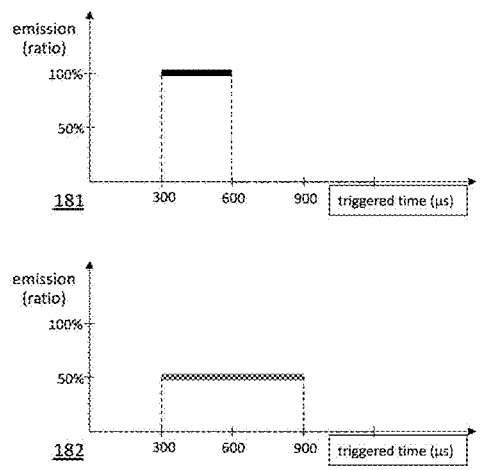
FIG. 10A
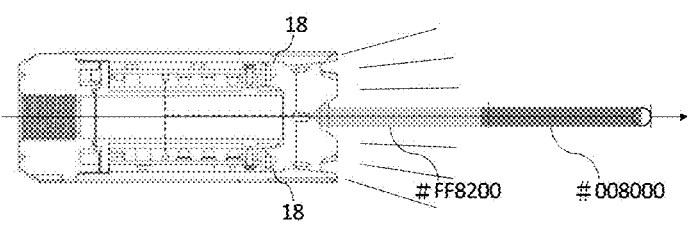
FIG. 10B

FIG. 11A
| component | time period | 300μs to 600μs |
|---|---|---|
| 181 | | 100% |
| component | time period | 600μs to 900μs |
|---|---|---|
| 182 | | 50% |
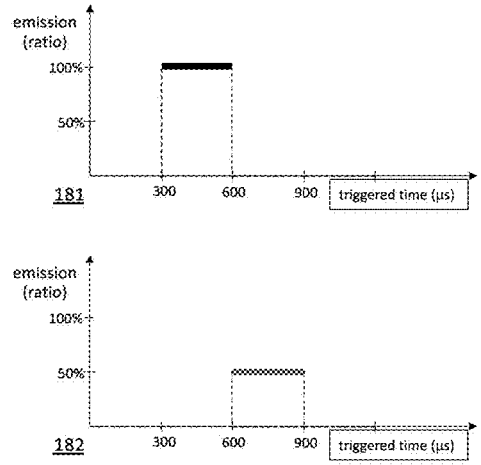
FIG. 11B
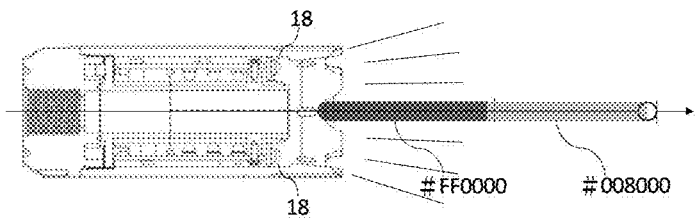
FF0000   #008000
FIG. 12A
| component | time period | 300μs to 900μs | 900μs to 1500μs |
|---|---|---|---|
| 181 | | 100% | 50% |
| component | time period | 600μs to 1200μs | 1200μs to 1800μs |
|---|---|---|---|
| 182 | | 50% | 100% |

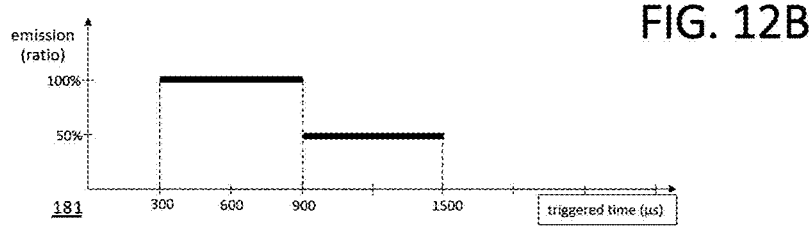
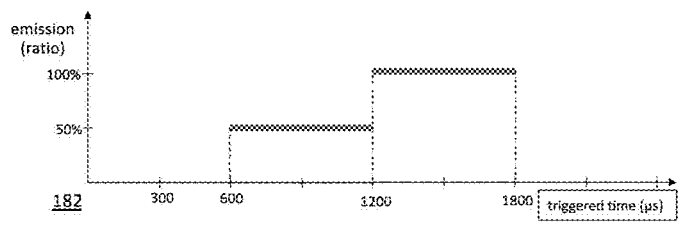
FIG. 12B
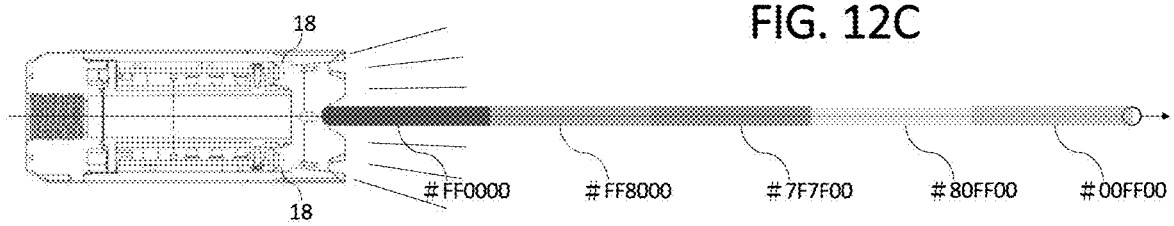
FIG. 12C
FIG. 13
| time period<br>component | A: 300μs to 700μs | B: 700μs to 1100μs | C: 1100μs to 1300μs | D: 1300μs to 1500μs | E: 1500μs to 1600μs | F: 1600μs to 1650μs | G: 1650μs to 1675μs |
|---|---|---|---|---|---|---|---|
| R | 8% | 19% | 93% | 82% | 53% | 37% | 22% |
| G | 29% | 46% | 78% | 16% | 4% | 27% | 21% |
| B | 5% | 11% | 34% | 22% | 12% | 44% | 34% |
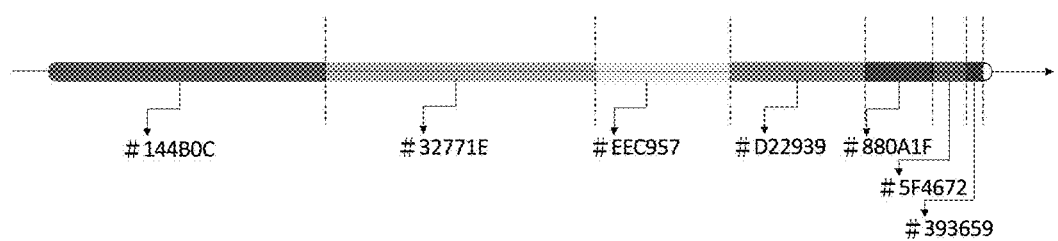

FIG. 19

| time period / component | A: 300μs to 700μs | B: 700μs to 1100μs | C: 1100μs to 1300μs |
|---|---|---|---|
| R | 88% | 97% | 92% |
| G | 0% | 51% | 89% |
| B | 0% | 2% | 8% |

106

| R | 88% | 97% | 92% |
|---|---|---|---|
| G | 0% | 51% | 89% |
| B | 0% | 2% | 8% |

106

...

| R | 88% | 97% | 92% |
|---|---|---|---|
| G | 0% | 51% | 89% |
| B | 0% | 2% | 8% |

106

| R | 92% | 88% | 97% |
|---|---|---|---|
| G | 89% | 0% | 51% |
| B | 8% | 0% | 2% |

107

| R | 92% | 88% | 97% |
|---|---|---|---|
| G | 89% | 0% | 51% |
| B | 8% | 0% | 2% |

107

...

| R | 92% | 88% | 97% |
|---|---|---|---|
| G | 89% | 0% | 51% |
| B | 8% | 0% | 2% |

107

| R | 97% | 92% | 88% |
|---|---|---|---|
| G | 51% | 89% | 0% |
| B | 2% | 8% | 0% |

108

| R | 97% | 92% | 88% |
|---|---|---|---|
| G | 51% | 89% | 0% |
| B | 2% | 8% | 0% |

108

...

| R | 97% | 92% | 88% |
|---|---|---|---|
| G | 51% | 89% | 0% |
| B | 2% | 8% | 0% |

108

MUZZLE FLASH SIMULATOR

CROSS REFERENCE TO RELATED APPLICATIONS

This application claims the benefit of U.S. Provisional Application No. 63/122,484, which was filed on Dec. 8, 2020, and is incorporated herein by reference.

BACKGROUND OF THE INVENTION

1. Field of the Invention

The present invention relates to a muzzle flash simulator for airsoft guns, and more particularly to a muzzle flash simulator capable of creating various beam effects.

2. Description of the Prior Art

Tracer units can often be seen when playing milsim games. It can light projectiles up for a while and allow you to know exactly where you're shooting in darkness.

However, it requires a specific type of projectiles: tracer projectiles (e.g., tracer BBs, glow in the dark BBs), which are coated in phosphor. As the tracer projectiles pass through the tracer unit, the tracer projectiles are given a quick charge by rows of lights within the tracer unit that "excites/charges" the phosphors causing the tracer projectiles to glow, thus emitting light as the tracer projectiles fly through the air and travel to its target.

SUMMARY OF THE INVENTION

The present invention provides a different kind of visual effect: muzzle flash effect, to simulate the visual effect of real firearm caused by the sudden release of high temperature gas from the muzzle during shooting. The present invention doesn't need said tracer projectile. Normal white projectile (e.g., plastic BBs) will be able to achieve the muzzle flash effect.

In some embodiments, a muzzle flash simulator for briefly illuminating light on a projectile passage in front of the muzzle flash simulator when triggered, includes:

an internal passage disposed through the muzzle flash simulator, wherein the projectile passage extends along the internal passage;

a first detector coupled to a controller and configured to transmit a trigger signal to the controller in response to detecting a projectile passing through the internal passage; and at least one flash light source, characterized in that the at least one flash light source, configured to illuminate the projectile passing away from the internal passage, includes a first illuminating component coupled to the controller and a second illuminating component coupled to the controller; the color or intensity of each one of the illuminating components (the first illuminating component and the second illuminating component) is tunable and can be precisely controlled by the controller; and in response to receiving the trigger signal from the first detector, the controller transmits illuminating commands to the illuminating components.

In such a manner, more tunable illuminating components can mix more different color combinations. An advantage of the disclosed embodiments is that there is no need to dispose the illuminating components within a close enough configuration. When each light source illuminates on the moving projectile, even if the light sources are disposed far away from each other, the surface of moving projectile still reflects colors. A trail having a mixed color could still be obtained.

In accordance with some embodiments, the controller uses a basic set of instructions to transmit the illuminating commands, and each instruction of the basic set of instructions includes a setting value for each one of the illuminating components at an indicated time period. Thus, the controller indicates the time periods of the illuminating components individually for reducing unnecessary power consumption and generating a visual effect of a tunable light beam.

In some embodiments, the controller uses a plurality of sets of instructions different from the basic set of instructions, to transmit the illuminating commands for subsequent shots in turns. A threshold for keeping using the same pattern (set of instructions) may be defined to make sure the next pattern will not be used if the time interval of trigger signals is shorter than the threshold. Thus, a preferable dynamic beam effect will be obtained.

In some embodiments, another threshold for adjusting each indicated time period of the current instructions to transmit the illuminating commands for subsequent shots may be defined, to activate another mode: each beam effect may become longer or shorter, to further differentiate received time intervals to generate different beam effects.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 9A-14 are exemplary configurations having a basic set of instructions for the illuminating components at indicated time periods in accordance with some embodiments.

FIG. 19 illustrates another combination of the sets of instructions in other embodiments.

DETAILED DESCRIPTION

Figure 1:
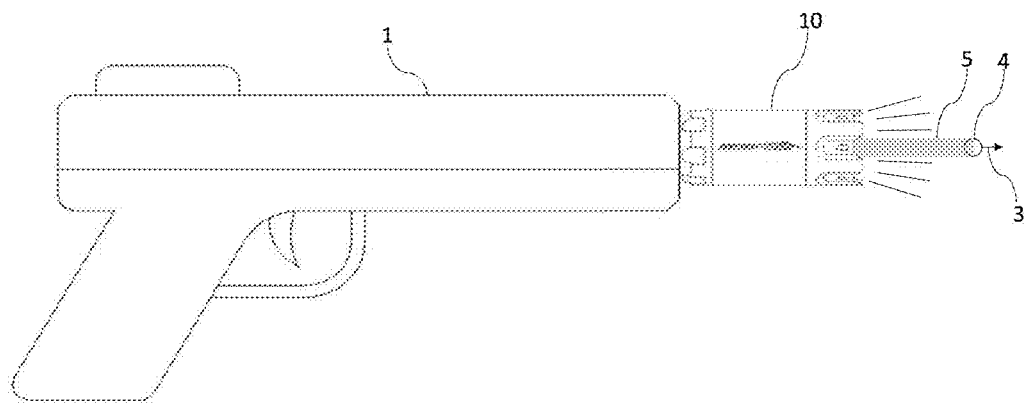
FIG. 1 illustrates an airsoft gun having a muzzle flash simulator in accordance with some embodiments.

Please refer to FIG. 1, a muzzle flash simulator 10 may be applied to an airsoft gun 1 (e.g., simulation gun, electric toy gun, paintball gun, gel blaster, and the like) for briefly illuminating light on a projectile passage 3 in front of the simulator 10 when triggered. When a moving projectile 4 is illuminated on the passage 3, the surface of the moving projectile 4 reflects a respective color, and then a trail 5 could be obtained by utilizing an afterimage phenomenon on eyes. The simulator 10 could be preferably implemented with a flash hider/suppressor/silencer/oppressor design.

Figure 2:
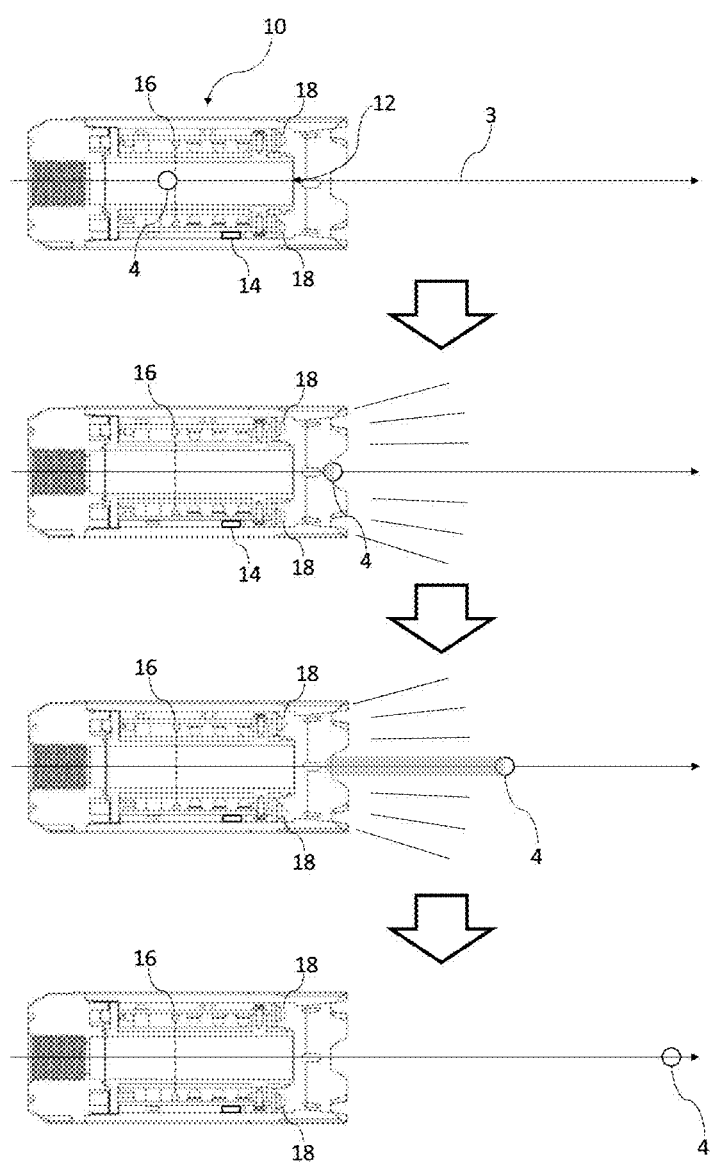
FIG. 2 illustrates various cross-section views of a projectile passing through and away from a muzzle flash simulator in an exemplary embodiment.

FIG. 2 shows various cross-section views of the projectile 4 when it passes through and away from the simulator 10. The simulator 10 includes: at least one flash light source 18, a controller 14, a first detector 16 disposed in the simulator 10, and an internal passage 12 disposed through the simulator 10, wherein the passage 3 extends along the passage 12.

Figure 3:
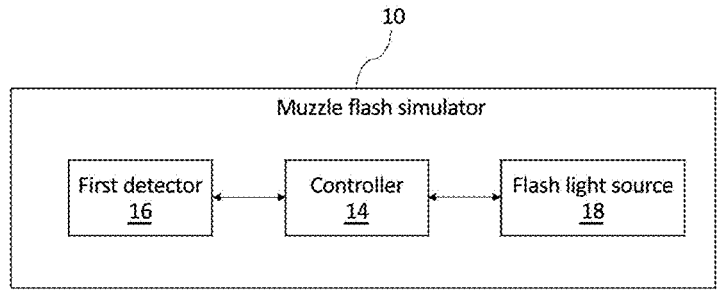
FIG. 3 illustrates a block diagram illustrating a muzzle flash simulator with a first detector and at least one flash light source in an exemplary embodiment.
Figure 4A:
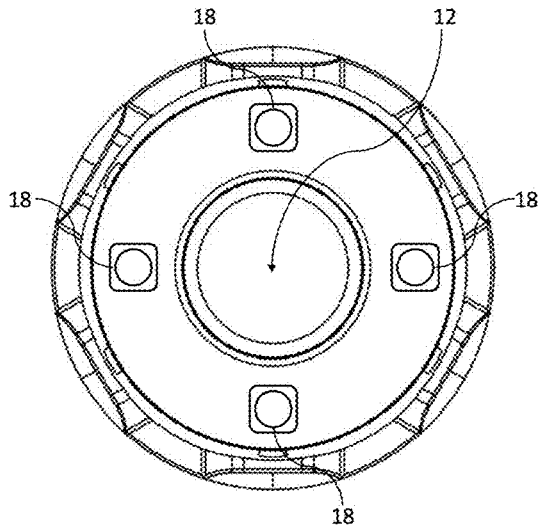
FIGS. 4A-6B are front views showing at least one flash light source having illuminating components outside of an internal passage in accordance with some embodiments.
Figure 4B:
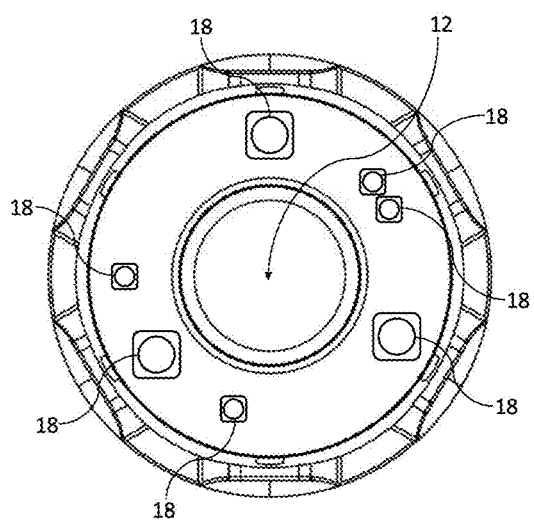

As shown in FIG. 3, the light source 18 is coupled to the controller 14 and the detector 16 is also coupled to the controller 14. The detector 16 is configured to transmit a trigger signal to the controller 14 in response to detecting a projectile 4 passing through the passage 12 at a predetermined location. In one embodiment, as shown in FIG. 4A, there are four light sources 18 disposed outside of the passage 12 in a radial arrangement for illuminating the projectile 4 passing away from the passage 12, but not limited thereto. The light source 18 may be disposed inside the passage 12 as long as it can illuminate the projectile 4 passing away from the passage 12. The light sources 18 may also be disposed outside of the passage 12 in a non-radial arrangement (e.g., randomly located configuration), as shown in FIG. 4B, to simulate the visual effect caused by sudden release of high temperature gas from the muzzle of real firearm.

Figure 5A:
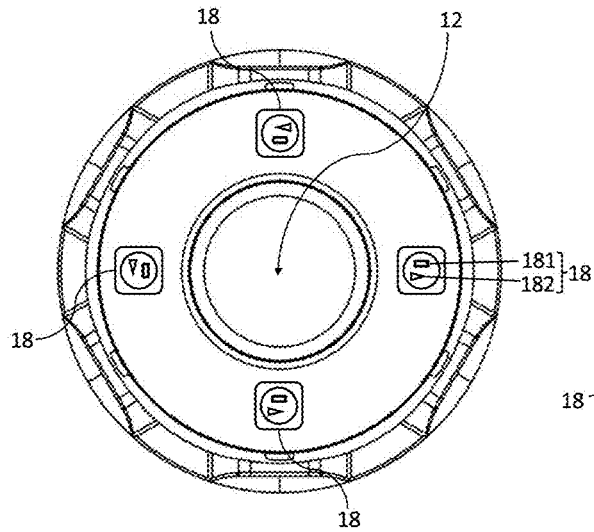

FIG. 5A shows an exemplary configuration described below, whereby the trail 5 having a mixed color can be obtained, characterized in that:

each of the flash light sources 18 may include a first illuminating component 181 coupled to the controller 14, and a second illuminating component 182 coupled to the controller 14. The color or intensity of each illuminating component is tunable and can be precisely controlled by the controller 14. In response to receiving the trigger signal from the detector 16, the controller 14 transmits illuminating commands to the illuminating components (e.g., the first illuminating component 181 and the second illuminating component 182).

Figure 5B:
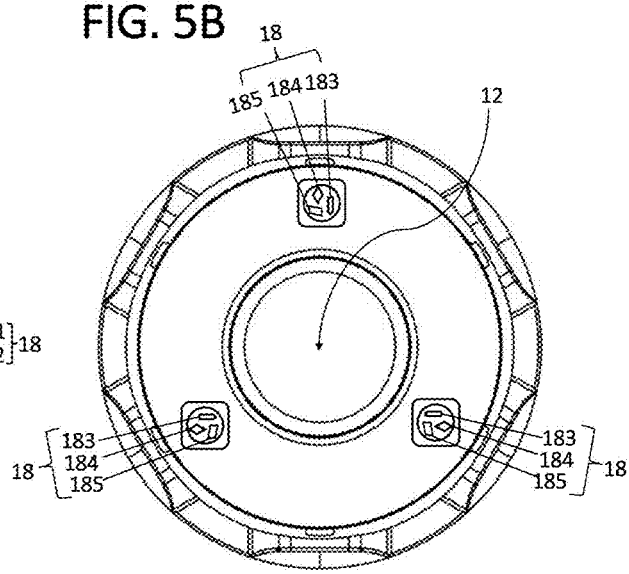

The illuminating component 181 and the illuminating component 182 may be preferably LEDs (light-emitting diodes) that each emits light of different respective colors. The light source 18 is not limited to include two tunable illuminating components. It may include three or more tunable illuminating components. In another embodiment, as shown in FIG. 5B, the light source 18 includes three LEDs of different colors (e.g., RGB LED or multicolored LED). Specifically, each light source 18 includes a red illuminating component 183, a green illuminating component 184 and a blue illuminating component 185. More tunable illuminating components can mix more different color combinations. For example, if the red illuminating component 183 has 255 tunable options and the green illuminating component 184 has 255 tunable options, the controller 14 can control the illuminating components to mix 255*255 different color combinations. Each tunable option may be a value of intensity (or color) of each illuminating component. Other options may be used; these two are provided as examples only and are not intended to be limiting.

Figure 6A:
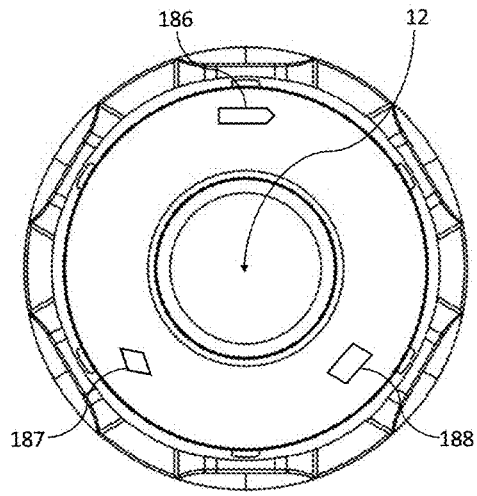
Figure 6B:
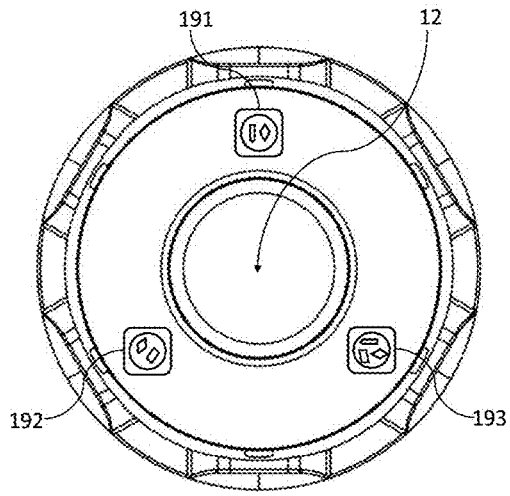

The light sources 18 may be a combination of the different illuminating components, as shown in FIG. 6A. A light source 186 is a red LED. A light source 187 is a green LED. A light source 188 is a blue LED. In other embodiments, each light source 18 may be a combination of two, or more than two light sources, as shown in FIG. 6B. A light source 191 is a combination of green and red LEDs; a light source 192 is a combination of green and blue LEDs; and a light source 193 is a combination of red, green and blue LEDs. An advantage of the present invention is that there is no need to dispose the illuminating components within a close enough configuration. When each light source illuminates on the moving projectile 4, even if the light sources are disposed far away from each other (e.g., more than one centimeter), the surface of moving projectile 4 still reflects colors. The trail 5 having a mixed color could still be obtained.

Figure 7A:
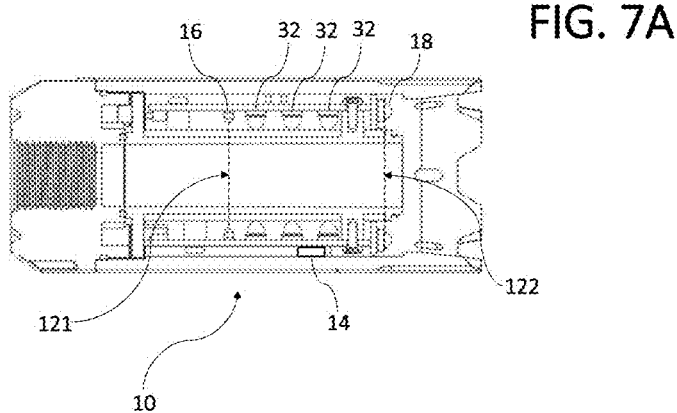
FIGS. 7A and 7B are a cross-section view and a block diagram illustrating a muzzle flash simulator further includes a plurality of tracer light sources in another embodiment.
Figure 7B:
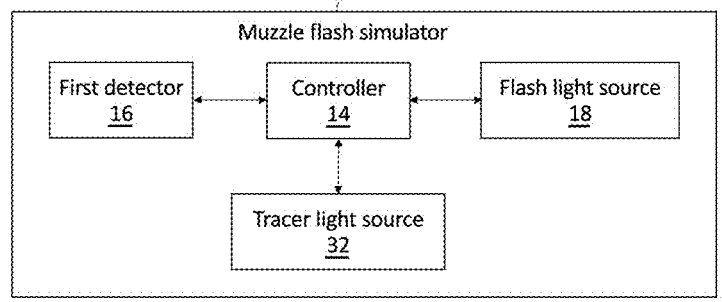

As shown in FIGS. 7A and 7B, the simulator 10 may further include a plurality of tracer light sources 32. The plurality of tracer light sources 32 may be arranged in a row (in parallel to the passage 12) and coupled to the controller 14. The plurality of tracer light sources 32, when triggered by the detector 16, flash a tracer projectile (not shown, e.g., tracer BB, which is infused with material that absorbs lights) as it passes through the passage 12 which makes it light up for a while after leaving the simulator 10. It should be noted that the present invention doesn't need said tracer projectile for obtaining the muzzle flash effect (e.g., trail 5 having a mixed color). Normal white projectile (e.g., plastic BBs) will be able to achieve the muzzle flash effect of a colorful light beam. When the simulator 10 further includes the plurality of tracer light sources 32. The timing of flashing the light sources 32 and 18 may be different by taking a delay time into consideration, to reduce unnecessary power consumption.

Figure 8:
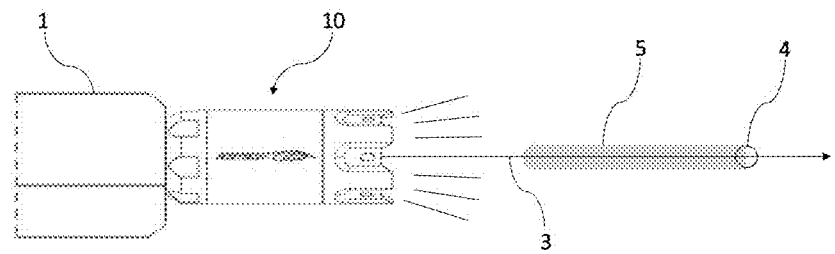
FIG. 8 illustrates an undesired gap between a muzzle flash simulator and a trail in an embodiment.

Please refer to FIG. 8, when illuminating light on the projectile 4 too late, there will be a gap (which is undesired) between the simulator 10 and the trail 5. But, illuminating light on the projectile 4 too early (before the projectile 4 reaching a plane 122 where the light source 18 is located, as illustrated in FIG. 7A) will cause unnecessary power consumption. In an embodiment, the detector 16 may be positioned proximate to the plane 122.

FIG. 9A shows an exemplary configuration described below, whereby the controller 14 indicates the time periods of the illuminating components individually for reducing unnecessary power consumption and generating a visual effect of a tunable light beam, characterized in that:

in response to receiving the trigger signal from the first detector 16, the controller 14 uses a basic set of instructions to transmit illuminating commands to the illuminating components. Each instruction of the basic set of instructions includes a setting value for one of the illuminating components at an indicated time period. The indicated time period is relative to when the trigger signal is received.

The illuminating component 181 may be (but not limited to) a red LED; and the illuminating component 182 may be (but not limited to) a green LED. When the detector 16 detects the projectile 4 passing through the passage 12 at a predetermined location (a plane 121 where the detector 16 is located, as illustrated in FIG. 7A), the controller 14 receives the trigger signal transmitted from the detector 16, and then uses a first set of instructions 101 as the basic set of instructions, to transmit illuminating commands to the illuminating components individually. The first set of instructions 101 includes a first instruction and a second instruction. The first instruction includes a setting value (e.g., 100% emission ratio) at the indicated time period (e.g., 300 µs~900 µs) for illuminating component 181. The second instruction includes a setting value (e.g., 50% emission ratio) at the indicated time period (e.g., 300 µs~900 µs) for illuminating component 182.

In such a manner, the simulator 10 can emit desired light options briefly at the indicated time period for leaving an orange light mixing trail #FF8200, as shown in FIG. 9B, and generate a single-layer light beam.

To distinguish trails having different colors in present application, the reference number of each trail having specific color will be hereinafter represented by the value of corresponding Hex color code.

The period values of the indicated time periods need not be the same. As shown in FIG. 10A, the controller 14 may adjust the period value, depending on the desired color-changing timing, to obtain a multi-layer light beam.

In an embodiment, the controller 14 uses a second set of instructions 102 as the basic set of instructions, to transmit illuminating commands having different period values of indicated time periods. The second set of instructions 102 includes a third instruction and a fourth instruction. The third instruction includes a setting value (e.g., 100% emission ratio) at the indicated time period (e.g., 300 µs~600 µs) for illuminating component 181. The fourth instruction includes a setting value (e.g., 50% emission ratio) at the indicated time period (e.g., 300 µs~900 µs) for illuminating component 182. In such a manner, the simulator 10 can emit desired light options having different period values of the indicated time periods for generating the multi-layer light beam. As shown in FIG. 10B, the light mixing trail #FF8200 and a green light trail #008000 could be obtained in order, by using the basic set of instructions having different period values of the indicated time periods, to transmit illuminating commands.

The indicated time periods need not be the same. As shown in FIG. 11A, the controller 14 may indicate different time periods, depending on the desired color-changing timing, to obtain the multi-layer light beam. In an embodiment, the controller 14 uses a third set of instructions 103 as the basic set of instructions, to transmit illuminating commands having different indicated time periods. The third set of instructions 103 includes a fifth instruction and a sixth instruction. The fifth instruction includes a setting value (e.g., 100% emission ratio) at one indicated time period (e.g., 300 µs~600 µs) for illuminating component 181. The sixth instruction includes a setting value (e.g., 50% emission ratio) at another indicated time period (e.g., 600 µs~900 µs) for illuminating component 182. In such a manner, the simulator 10 can emit desired light options having different indicated time periods for generating the multi-layer light beam. As shown in FIG. 11B, the red light trail #FF0000 and the green light trail #008000 could be obtained in order, by using the basic set of instructions having different indicated time periods, to transmit illuminating commands.

As shown in FIGS. 12A and 12B, after triggered, the setting values of the illuminating commands may vary with time. In an embodiment, the controller 14 uses a fourth set of instructions 104 as the basic set of instructions, to transmit illuminating commands varying with time after receiving the trigger signal. The fourth set of instructions 104 includes a seventh instruction and an eighth instruction. The seventh instruction includes a setting value (for illuminating component 181): 100% emission ratio, at indicated time period: 300 µs~600 µs; and a setting value: 50% emission ratio, at indicated time period: 900 µs~1500 µs. The eighth instruction includes a setting value (for illuminating component 182): 50% emission ratio, at indicated time period: 600 µs~1200 µs; and a setting value: 100% emission ratio, at indicated time period: 1200 µs~1800 µs. In such a manner, as shown in FIG. 12C, the red light trail #FF0000, a light mixing trail #FF8000, a light mixing trail #7F7F00, a light mixing trail #80FF00 and a green light trail #00FF00 could be obtained in order.

Figure 14:
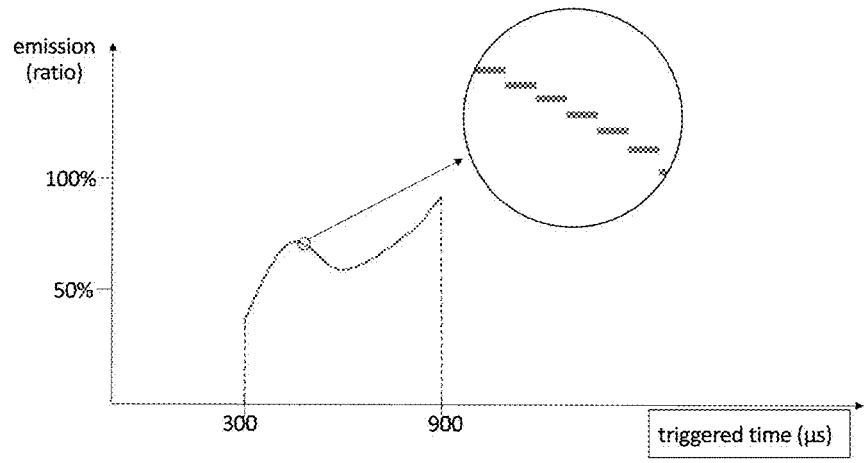

As shown in FIG. 13, an embodiment shows how to obtain a visual effect of light beam with more layers, by using three sets of tunable illuminating components: a red first illuminating component R, a green second illuminating component G and a blue third illuminating component B. The controller 14 uses a fifth set of instructions 105 as the basic set of instructions, including indicated time periods: A(300 µs to 700 µs), B(700 µs to 1100 µs), C(1100 µs to 1300 µs), D(1300 µs to 1500 µs), E(1500 µs to 1600 µs), F(1600 µs to 1650 µs) and G(1650 µs to 1675 µs), to obtain a light mixing trail #144B0C, a light mixing trail #32771E, a light mixing trail #EEC957, a light mixing trail #D22939, a light mixing trail #880A1F, a light mixing trail #5F4672 and a light mixing trail #393659 in order. The controller 14 may gradually shorten the periods of indicated time, to obtain a subtle change in the visual effect of the light beam. Furthermore, how to adjust the illuminating components is not limited to the square shape (digital shape) configuration as shown in FIGS. 12 and 13. The present invention may adopt an analog shape configuration (e.g., a wave shape configuration), as shown in FIG. 14, to make the beam effect vary more smoothly. For example, the controller 14 may include as many indicated time periods with different setting values as possible in an extremely short period of time (e.g., more than 10 indicated time periods with different setting values within 100 µs). Different combinations of different illuminating components can be used for making the beam effect vary even more smoothly and more colorfully. The setting value may be emission ratio, emission intensity, indicated color, or Hex color code, but not limited thereto. The indicated time period may include two (or more than two) setting values.

Figure 15A:
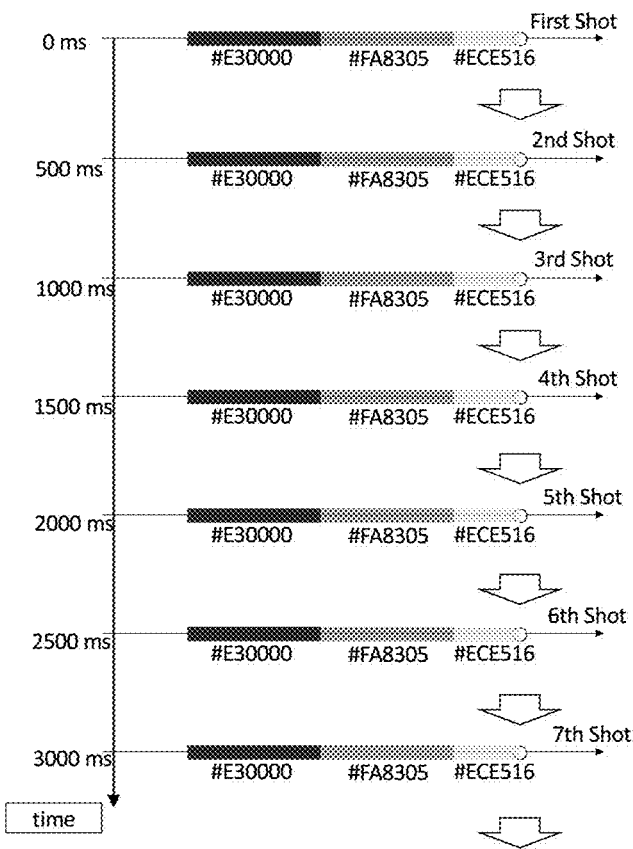
FIGS. 15A-18C are exemplary configurations of the muzzle flash simulator having one combination of the sets of instructions for preferable dynamic beam effects in other embodiments.
Figure 15B:
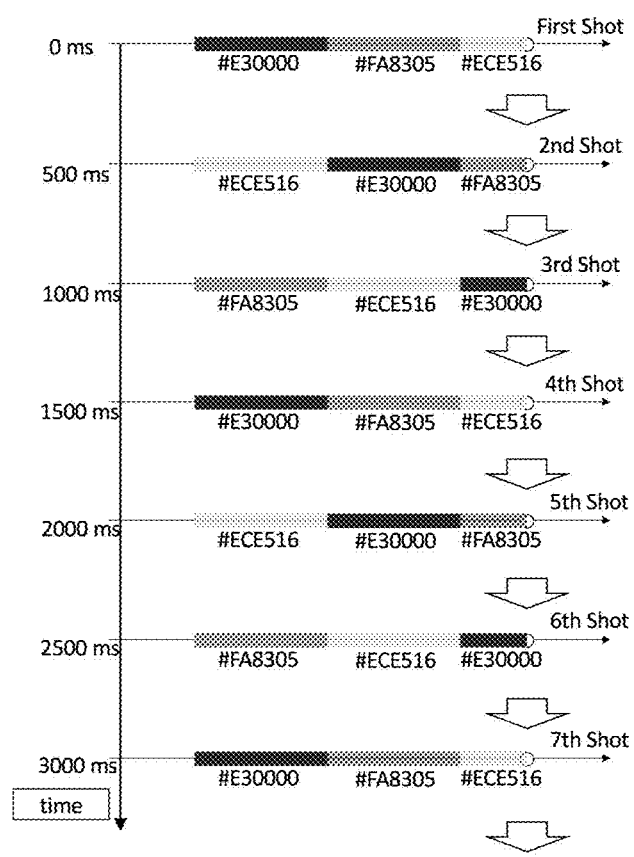

As shown in FIG. 15A, when a user shoots multiple shots (while a trigger is pulled) within a short period of time. The visual effect can become boring due to repetition. The present invention may adopt different sets of instructions for the subsequent shots to obtain a dynamic beam effect as shown in FIG. 15B. The controller 14 may keep monitoring and calculating a received time interval of the trigger signal. Based on the time interval, the controller 14 can determine whether the user is shooting continuously or not.

Figures 16A, 16B:
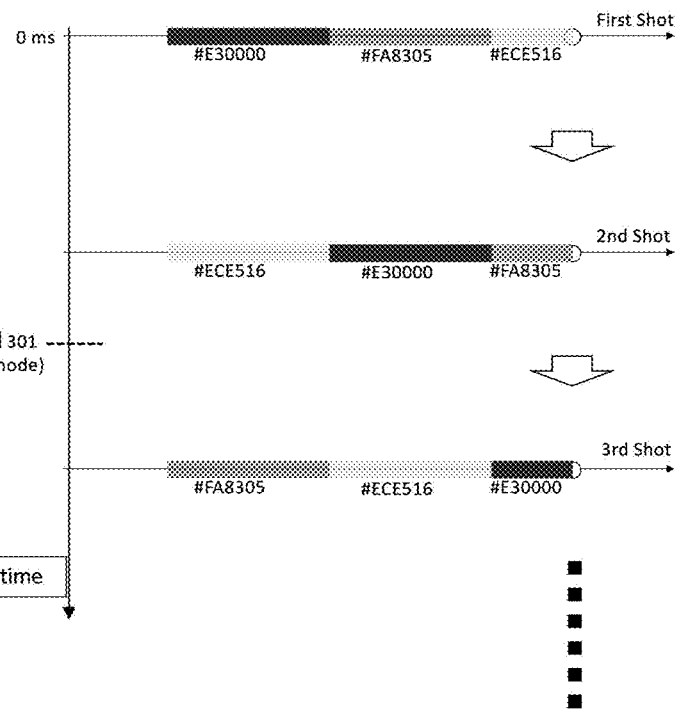

FIG. 16A shows an exemplary configuration described below, characterized in that:

the controller 14 uses a plurality of sets of instructions different from the basic set of instructions, to transmit the illuminating commands for subsequent shots in turns. For example, a first threshold 301 (e.g., 600 ms) for activating a dynamic mode may be defined. If a subsequent trigger signal is received within the threshold 301, the dynamic mode may be activated: using a plurality of predefined patterns (sets of instructions) to transmit illuminating commands in turns. For example, trail #E30000, trail #FA8305 and trail #ECE516 may be assigned to different indicated time periods for different subsequent shots.

FIG. 16B shows a first combination of the sets of instructions, including a sixth set of instructions 106 (for first shot), a seventh set of instructions 107 (for 2nd shot), and an eighth set of instructions 108 (for 3rd Shot). When triggered, the controller 14 uses the sixth set of instructions 106 as the basic set of instructions to transmit illuminating commands to obtain a visual effect of a three-layer light beam. When a subsequent trigger signal is received within the threshold

301, the controller 14 uses the seventh set of instructions 107 to transmit illuminating commands, wherein at least one setting value of the seventh set of instructions 107 is different from the corresponding setting value of the sixth set of instructions 106 to obtain another beam effect different from the previous shot. For example, how the setting values vary with time may be the same but the indicated time periods are different as shown in FIG. 16A, or the setting values are different at the same indicated time period. The amount of the combination of the sets of instructions may be more than three (e.g., four to ten, or even more), to obtain a more dynamic beam effect. In other words, the controller 14 is configurable with the threshold 301 related to the time interval of receiving trigger signals. The controller 14 keeps monitoring the time interval and in response to receiving a subsequent trigger signal within the threshold 301, uses a plurality of sets of instructions different from the basic set of instructions to transmit the illuminating commands for subsequent shots in turns.

However, a shortest time interval: how fast the airsoft gun can shoot for the next shot may be different from different airsoft guns. It may be different ranging from 27 ms to 100 ms. Even the same airsoft gun, depending on the choice of the user, may shoot at different time intervals. When the time interval is too short (the next shot is too fast to be triggered), the preferable dynamic beam effect will be affected. For example, a dynamic beam effect configured to switch from a red trail to a green trail, when the time interval is too short, will be mixed to yellow trails.

Figure 17A:
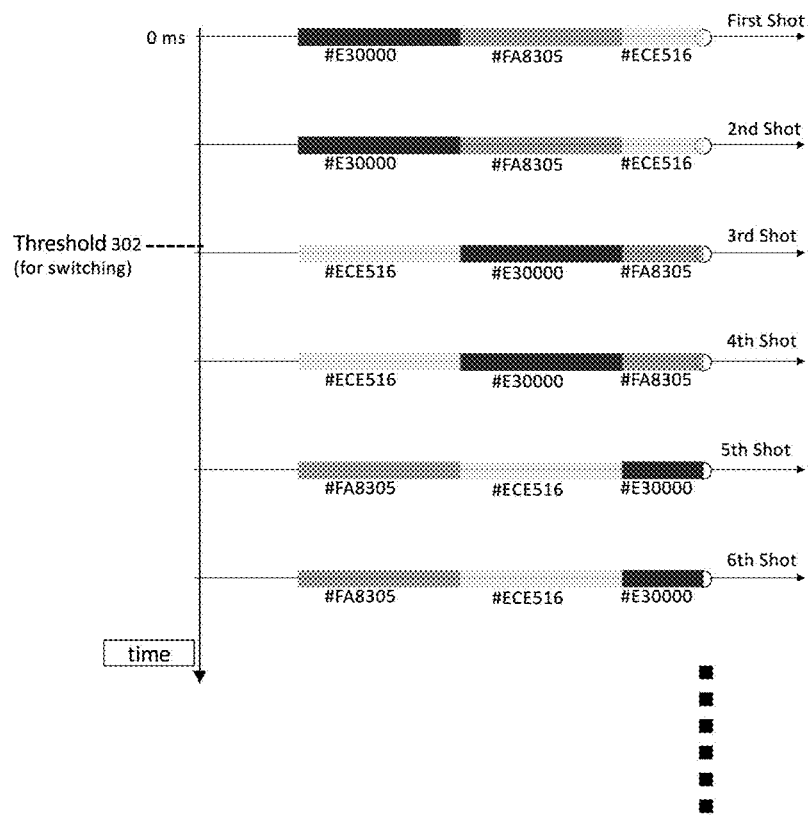
Figure 17B:
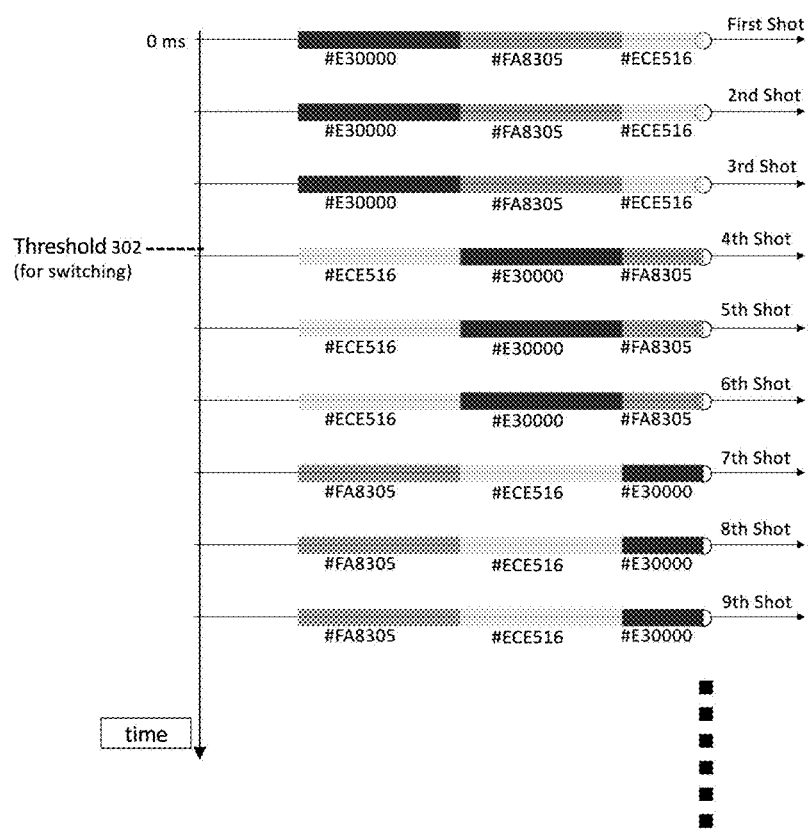
Figure 17C:
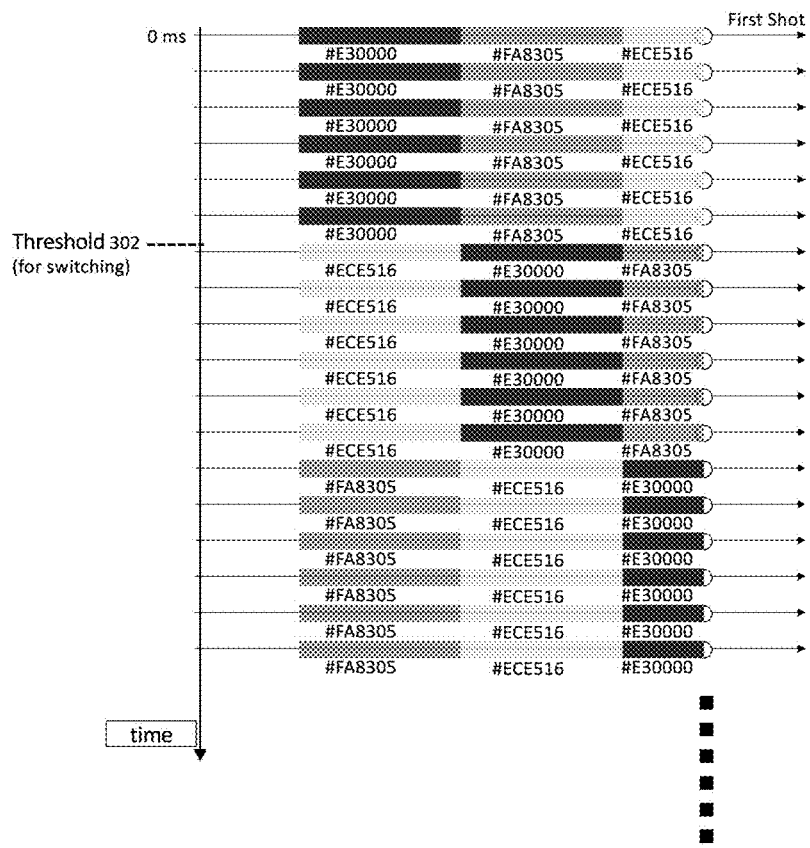

As shown in FIGS. 17A, 17B and 17C, a second threshold 302 for keeping using the same pattern (set of instructions) may be defined to make sure the next pattern will not be used if the time interval is shorter than the threshold 302. Instead, keeps using the same pattern until the time interval between the first shot and the current shot is exceeding the threshold 302, then switches to the next pattern. The value of the threshold 302 is less than the threshold 301. Because the threshold 302 is the configuration to make sure that the dynamic beam effect can be obtained after activating the dynamic mode (by threshold 301).

For example, the threshold 302 may be 300 ms. When the time interval between the first shot and the current shot is less than 300 ms, no matter there are 2, 3, 6, even more than a dozen shots within 300 ms, keeps using the instructions 106 until exceeding 300 ms, then switches to instructions 107 several shots until the time interval between the first shot of instructions 107 and the current shot exceeding 300 ms, then switched to next instruction, etc. In other words, the controller 14 is configurable with the threshold 302 related to the time interval of receiving trigger signals. In response to receiving the subsequent trigger signal within the threshold 302, the controller 14 keeps using the basic set of instructions to transmit the illuminating commands; and in response to receiving the subsequent trigger signal exceeding the threshold 302, the controller 14 uses a next set of instructions different from the basic set of instructions to transmit the illuminating commands for subsequent shots. In such a manner, although during switching the patterns the undesired mixed effect will still happen, but generally a dynamic beam effect having three sets of patterns can still be obtained in order.

Figure 18A:
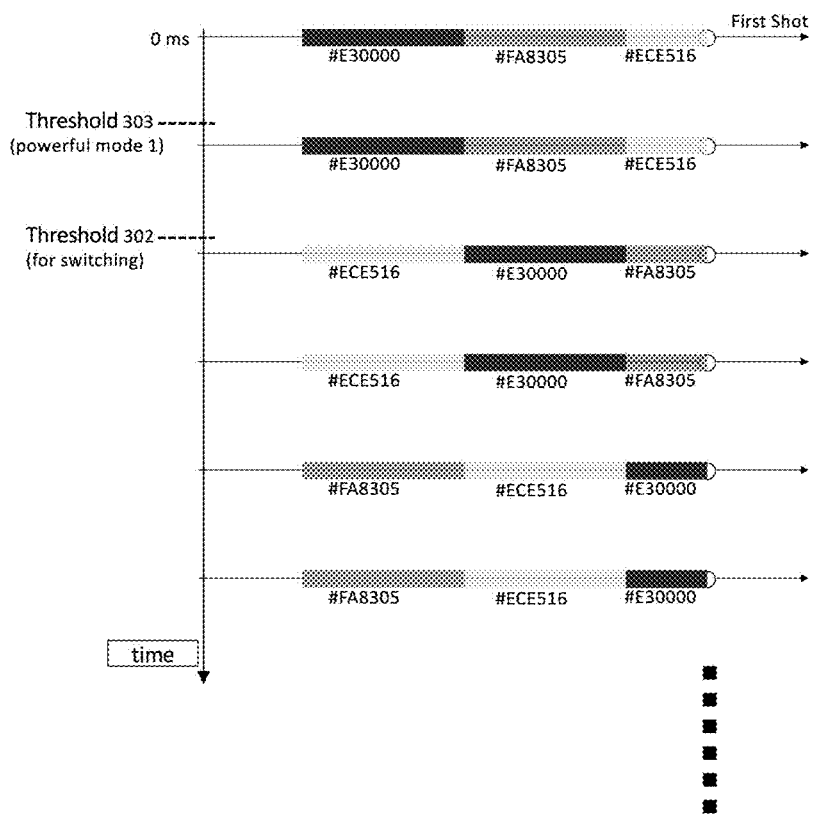
Figure 18B:
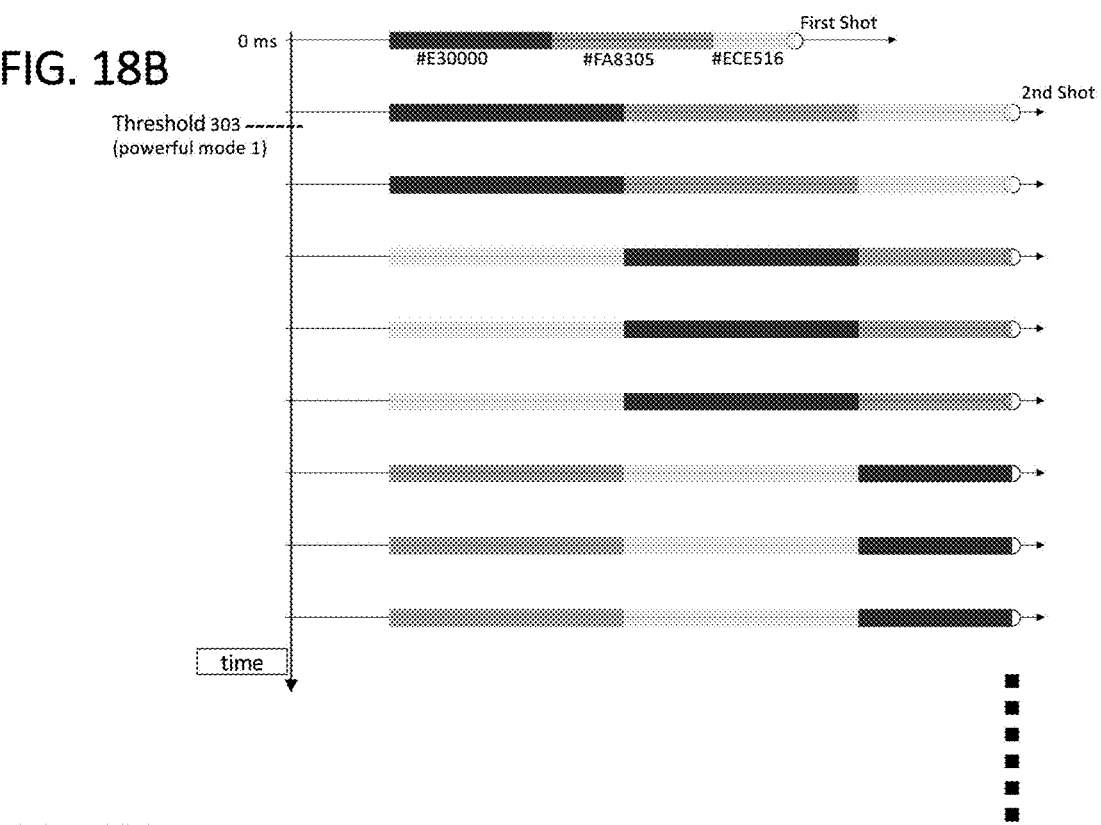

As shown in FIGS. 18A and 18B, the controller 14 may be configurable with at least one third threshold 303 related to the time interval of receiving trigger signals. In response to receiving the subsequent trigger signal within the threshold 303, the controller 14 may increase each indicated time period of the current instructions to transmit the illuminating commands for subsequent shots.

For example, the threshold 303 for activating a powerful mode 1, and a fourth threshold 304 for activating a powerful mode 2 may be defined, so that when more shots within a short period of time, a length of each beam effect will become longer. The value of the threshold 303 and the threshold 304 may be less than the threshold 302, when the thresholds 303 and 304 are configured to further differentiate received time intervals to generate different beam effects.

Figure 18C:
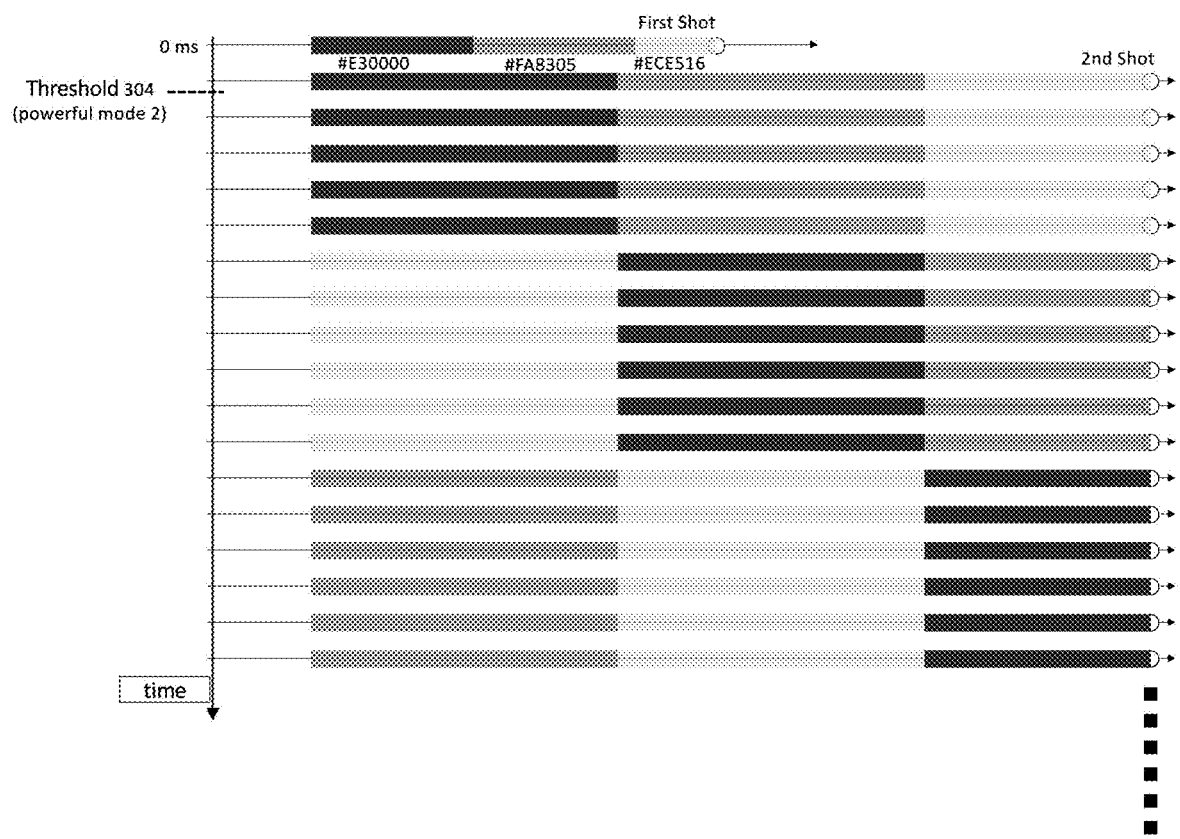

As shown in FIG. 18A, in an embodiment, when the next shot is triggered within the threshold 302 but not the threshold 303, uses the first combination of the sets of instructions (106, 107 and 108) and keeps using the same pattern until exceeding the threshold 302. However, when the next shot is triggered within the threshold 303, as shown in FIG. 18B, uses the first combination of the sets of instructions (106, 107 and 108) but increases each indicated time period of the instructions. Furthermore, when the next shot is triggered within the threshold 304, as shown in FIG. 18C, further increases each indicated time period of the instructions to obtain an even longer beam effect.

How to increase each indicated time period of the instructions is not limited to be proportional. For example, for the threshold 303, each indicated time period of the instructions may be: a basic period (being the same to the threshold 302)+one unit (e.g., 400 μs+0.5(400 μs)=600 μs). For the threshold 304, each indicated time period of the instructions may be: a basic period (being the same to the threshold 302)+two units (e.g., 400 μs+0.5(400 μs)*2=800 μs).

Please be noted that the exemplary configurations in FIGS. 16A to 18C only uses one combination of the sets of instructions (e.g., 106, 107 and 108). However, the controller 14 may just include a plurality of combinations of the sets of instructions to activate different dynamic beam effects. In another exemplary configuration, characterized in that: the controller 14 may include a plurality of combinations of the sets of instructions and a plurality of thresholds for differentiating different time intervals, wherein each combination of the sets of instructions is associated with one of the plurality of thresholds. The controller 14 keeps monitoring the time interval of receiving trigger signals and uses the associated combination of the sets of instructions to transmit the illuminating commands for subsequent shots in turns, in response to receiving the subsequent trigger signal within any one of the plurality of thresholds. In one embodiment, in response to receiving trigger signals within a time interval of 600 ms~100 ms, chooses a second combination of the sets of instructions (e.g., 101, 102 and 104) to obtain a second dynamic beam effect; in response to receiving trigger signals within the time interval of 100 ms~30 ms, chooses a third combination of the sets of instructions (e.g., 106, 106, 104, 104, 105 and 105) different from the previous combination of the sets of instructions to obtain a third dynamic beam effect; and in response to receiving trigger signals within the time interval of 30 ms-25 ms, chooses a fourth combination of the sets of instructions (e.g., 106, 106, . . . 106, 107, 107, . . . 107, 108, 108 . . . 108, as shown in FIG. 19) different from the previous combination of the sets of instructions to obtain a fourth dynamic beam effect.

Figure 20:
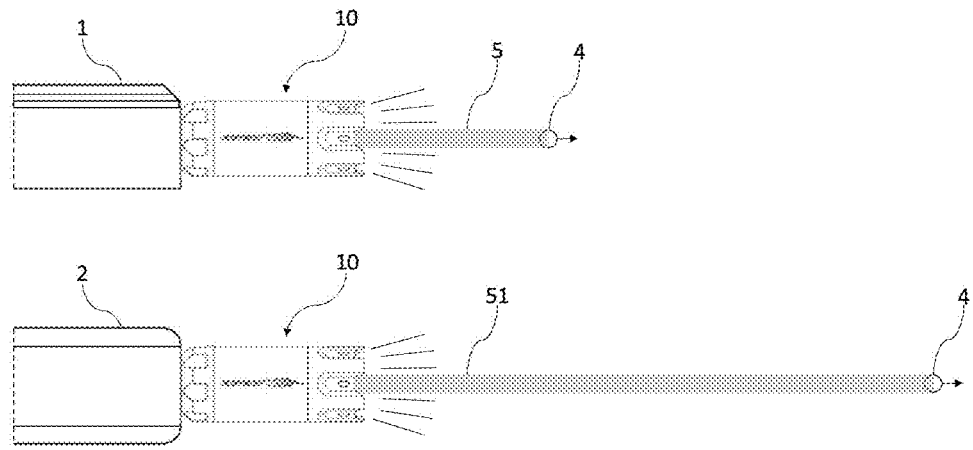
FIGS. 20-23B illustrate a muzzle flash simulator further including a second detector for calculating the velocity of projectiles in other embodiments.

How fast the projectile 4 can fly (i.e., velocity) when shot from different airsoft guns may be different. The velocity of a flying projectile from some airsoft pistols may be 30 m/sec only, while the velocity of the flying projectile from other airsoft rifles may be as high as 180 m/sec. While the indicated time period is the same, but the velocity of the flying projectile is higher, the length of the beam effect will be longer. For example, as shown in FIG. 20, an airsoft rifle 2 can shoot the flying projectile at a velocity of 90 m/sec; and the airsoft pistol 1 can shoot the flying projectile at a velocity of 30 m/sec. When both airsoft guns using the same simulator 10 for shooting, if the setting is also the same, the trail 51 obtained by the airsoft rifle 2 will be longer than the trail 5 obtained by the airsoft pistol 1. When the velocity of the flying projectile is too high, the length of the beam effect will be too long. This is a problem since the simulator 10 is trying to simulate the visual effect of real firearm.

Figure 21:
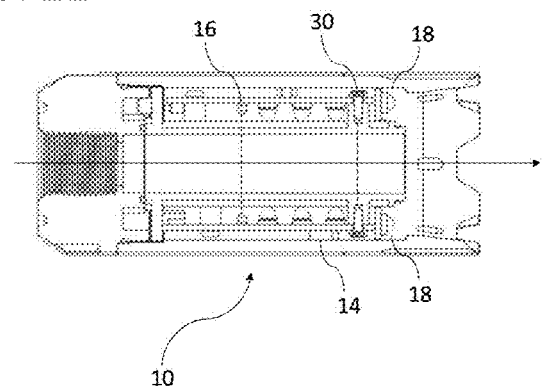
Figure 22:
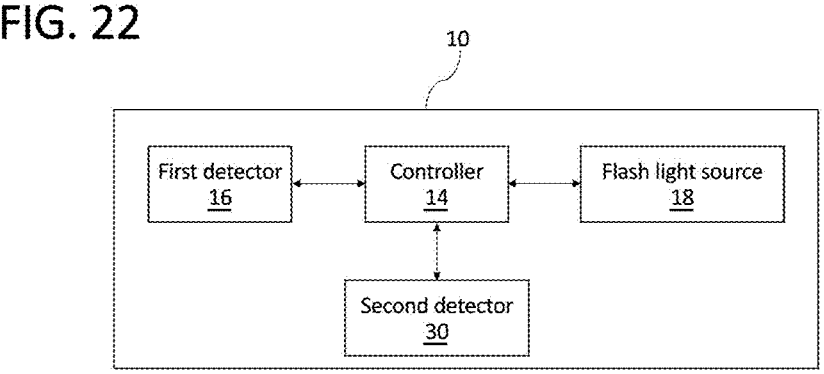
Figure 23A:
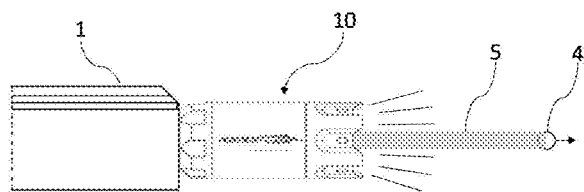
Figure 23A:
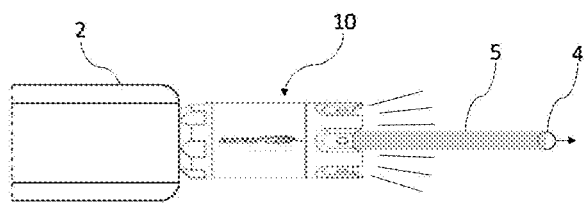
Figure 23B:
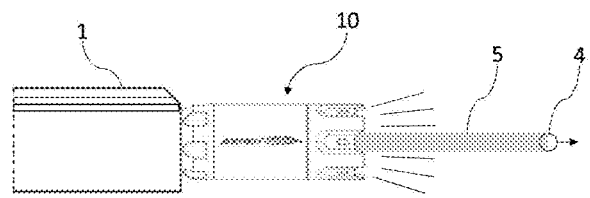
Figure 23B:
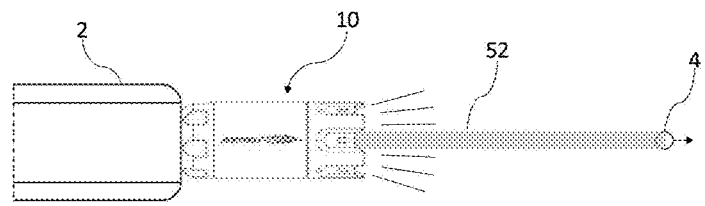

FIG. 21 shows an exemplary configuration described below, for solving said problem, characterized in that: the muzzle flash simulator 10 may further include a second detector 30. The second detector 30 is coupled to the controller 14, as shown in FIG. 22, and configured with the first detector 16 to calculate the velocity of the projectile 4 passing through the detectors. The detectors may be disposed in substantially parallel to the passage 12. The controller 14 may adjust a duration of each indicated time period of the instructions based on the calculated velocity. As shown in FIG. 23A, the airsoft rifle 2 may obtain the trail 5 like the airsoft pistol 1. In other words, the beam effects having different lengths in FIG. 20 may be adjusted to the beam effects having the same length in FIG. 23A, but not limited thereto. As shown in FIG. 23B, the controller 14 may adjust each indicated time period by a predetermined ratio, so that when the velocity is extremely fast (e.g., 180 m/sec), a trail 52 having a reasonable length may still be obtained.

Figure 24A:
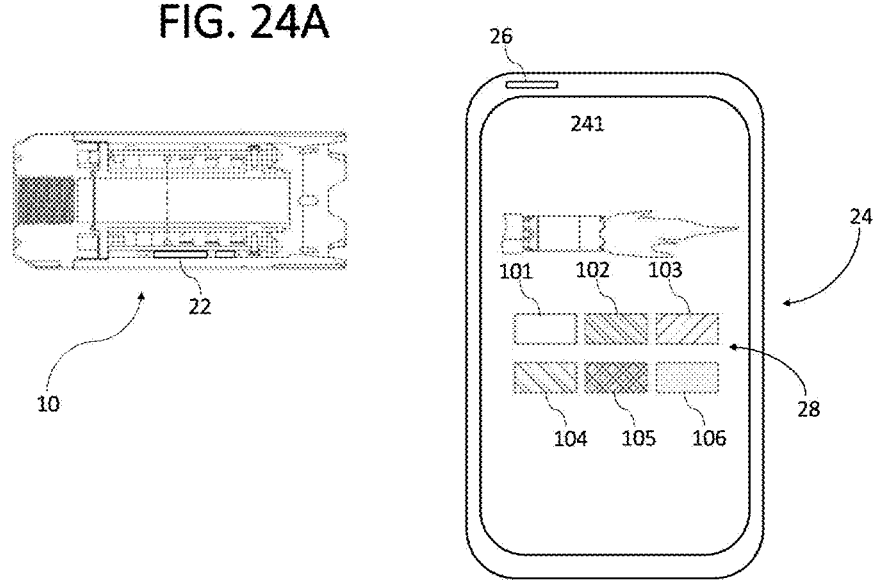
FIGS. 24A-26B illustrate a muzzle flash simulator further including a communication unit for various user interfaces in other embodiments.
Figure 24B:
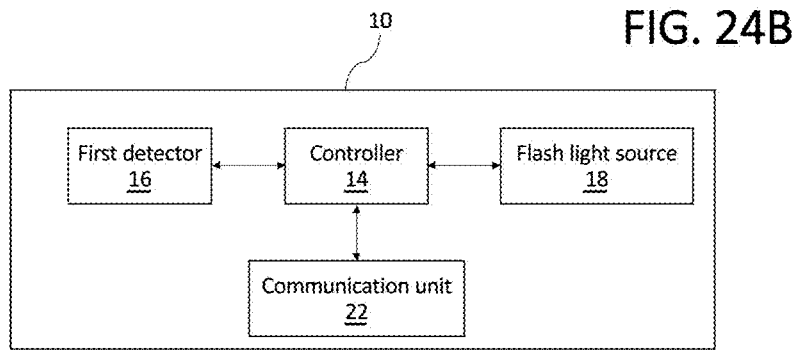

A conventional airsoft tracer usually only has one physical switch for power on/off. It would be hard for the user (compared to the manufacturer) to choose desired color. The muzzle flash simulator 10 could further include a communication unit 22. As shown in FIGS. 24A and 24B, the communication unit 22 can wirelessly communicate with a wireless device 24 (e.g., a smartphone, a notebook, etc.) via a communication unit 26 disposed on the wireless device 24. The wireless device 24 may have a user interface 28, on a touch screen 241, configured to allow the user to choose a predetermined (fine-tuned) pattern (e.g., 101, 102, 103, 104, 105, or 106) for different color-varying effects or a predetermined dynamic beam effect.

Figure 25A:
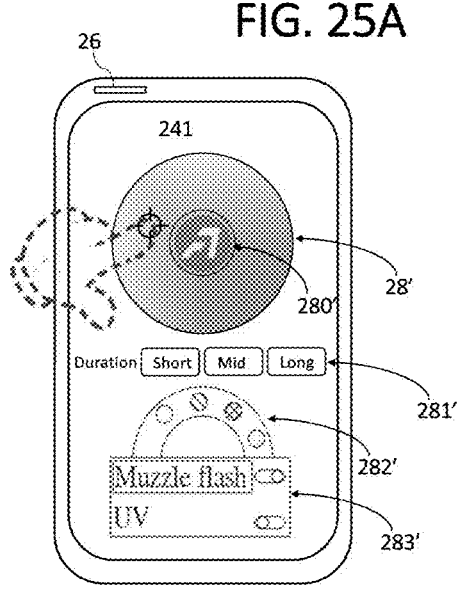

As shown in FIG. 25A, in one embodiment, the user can choose desired color via a user interface 28', a color wheel adjustment interface, wherein a plurality of selectable options are all included in the color wheel. Each option of the plurality of selectable options is associated with a respective instruction. An interface 280' may display the selected color. For example, a color option A is selected and shown in the interface 280'; the user may adjust the duration of the indicated time periods via an interface 281' to further shorten or lengthen desired light beam effect; the user may choose the predetermined pattern or dynamic beam effect via a user interface 282'; and the user may turn on/off specific functions (e.g., muzzle flash, UV tracer, etc.) of the simulator 10, via a user interface 283'.

Figure 25B:
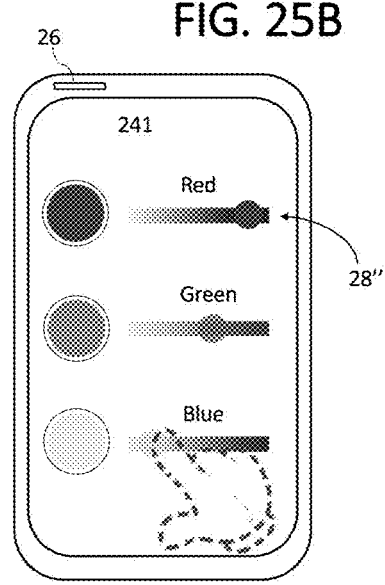
Figure 26A:
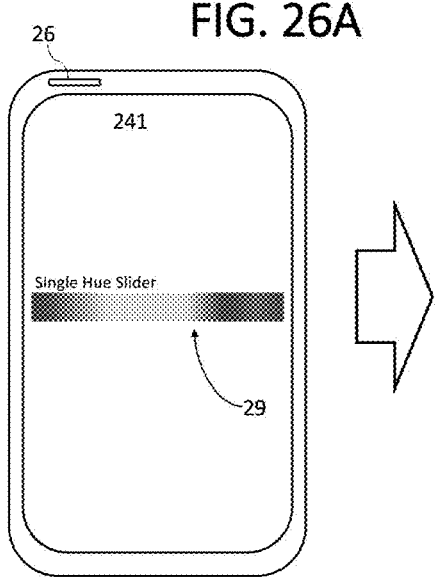
Figure 26B:
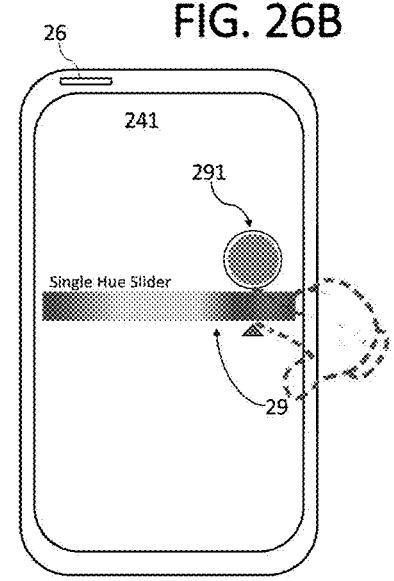

As shown in FIG. 25B, in another embodiment, the user may independently adjust each tunable illuminating component via an interface 28", a plurality of slider bars. As shown in FIG. 26A, in other embodiments, the user may also adjust all tunable illuminating components via an interface 29, a single slider bar (e.g., single hue slider). When the user selects a specific color (option), an area near interface 29 may further display a sign and an interface 291 to display the selected color, as shown in FIG. 26B.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A muzzle flash simulator for briefly illuminating light on a projectile passage in front of the muzzle flash simulator when triggered, comprising:
    an internal passage disposed through the muzzle flash simulator, wherein the projectile passage extends along the internal passage;
    a first detector coupled to a controller and configured to transmit a trigger signal to the controller in response to detecting a projectile passing through the internal passage; and
    at least one flash light source, wherein the at least one flash light source, configured to illuminate the projectile passing away from the internal passage, includes a first illuminating component coupled to the controller and a second illuminating component coupled to the controller; the color and intensity of each one of the illuminating components is tunable and can be precisely controlled by the controller; in response to receiving the trigger signal from the first detector, the controller transmits illuminating commands to the illuminating components; the controller uses a basic set of instructions to transmit the illuminating commands, and each instruction of the basic set of instructions includes a setting value for each one of the illuminating components at an indicated time period; and after triggered, the setting values of the illuminating commands vary with time.

2. The muzzle flash simulator of claim 1, further comprising: at least one tracer light source, coupled to the controller and configured to flash the projectile as the projectile passes through the passage; and
    the timing of flashing the flash light source and the tracer light source is different by taking a delay time into consideration.

3. The muzzle flash simulator of claim 2, wherein the controller uses a plurality of sets of instructions different from the basic set of instructions, to transmit the illuminating commands for subsequent shots in turns.

4. The muzzle flash simulator of claim 2, wherein the controller includes a plurality of combinations of the sets of instructions; the controller includes a plurality of thresholds for differentiating different time intervals, wherein each combination of the sets of instructions is associated with one of the plurality of thresholds; and the controller keeps monitoring the time interval of receiving trigger signals and uses the associated combination of the sets of instructions to transmit the illuminating commands for subsequent shots in turns, in response to receiving a subsequent trigger signal within any one of the plurality of thresholds.

5. The muzzle flash simulator of claim 4 further comprising:
    a second detector coupled to the controller for calculating a velocity of the projectile, wherein the controller adjusts a duration of the indicated time period based on the calculated velocity.

* * * * *